United States Patent [19]

Evans

[11] 4,316,630
[45] Feb. 23, 1982

[54] VEHICLE WIND DEFLECTORS

[76] Inventor: Jack L. Evans, 110 Devenshire Cir., Rough & Ready, Calif. 95945

[21] Appl. No.: 153,032

[22] Filed: May 27, 1980

[51] Int. Cl.³ .............................................. B62D 37/02
[52] U.S. Cl. ...................................................... 296/1 S
[58] Field of Search ................................... 296/1 S, 91

[56] References Cited

U.S. PATENT DOCUMENTS

| | | | |
|---|---|---|---|
| 1,923,349 | 8/1933 | Wolverton | 296/1 S |
| 2,863,695 | 12/1958 | Stamm | 296/1 S |
| 3,010,754 | 11/1961 | Shumaker | 296/1 S |
| 4,093,300 | 6/1978 | Snizek | 296/1 S |

Primary Examiner—Robert R. Song
Attorney, Agent, or Firm—Roger A. Marrs

[57] ABSTRACT

Vehicle wind deflectors are disclosed herein which are carried on the cab or tractor of a semi-trailer combination and carried on the rear end of the trailer. The cab or tractor deflector includes a base mounting for supporting a panel at an angle so as to deflect ram air immediately ahead of the trailer. The trailer rear end deflectors include a pair of elongated deflectors carried at the opposite corners of the trailer wherein each deflector is arcuate in cross section so as to wrap around the corner in fixed spaced relationship to the structure of the trailer to define an air passageway therebetween. Associated with rear deflector, there is a plurality of air spreaders or pipes which accept a portion of the deflected ram air and conduct the air to given areas at the rear of the trailer to break the creation of any vacuum. Angled flanges are disposed at the entrance to each of said spreaders or pipes to catch and direct ram air into the spreaders or pipes.

6 Claims, 7 Drawing Figures

U.S. Patent  Feb. 23, 1982  4,316,630
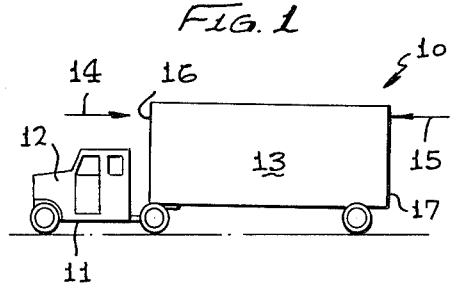
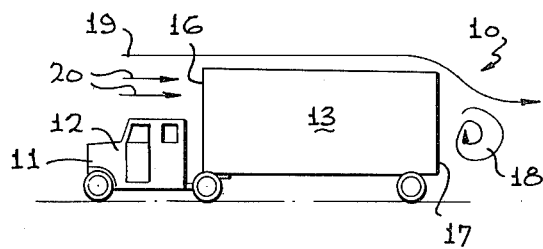
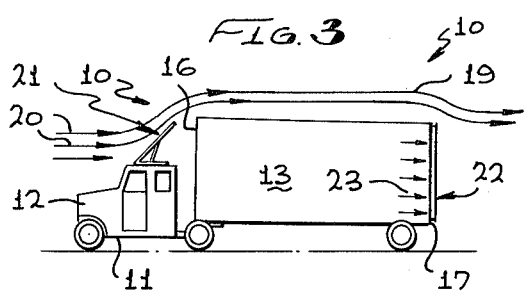
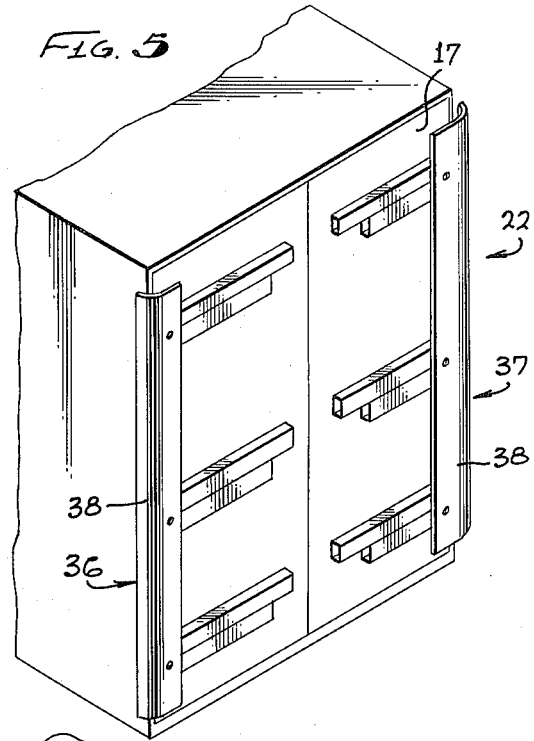
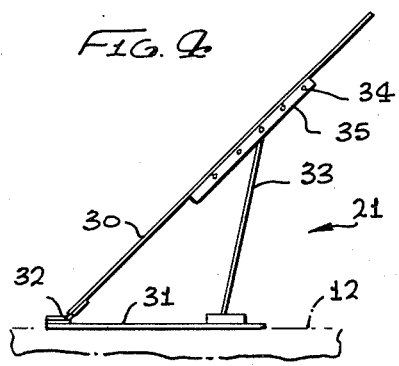
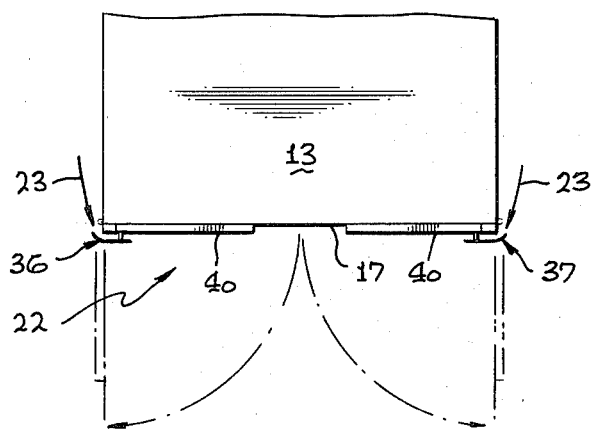
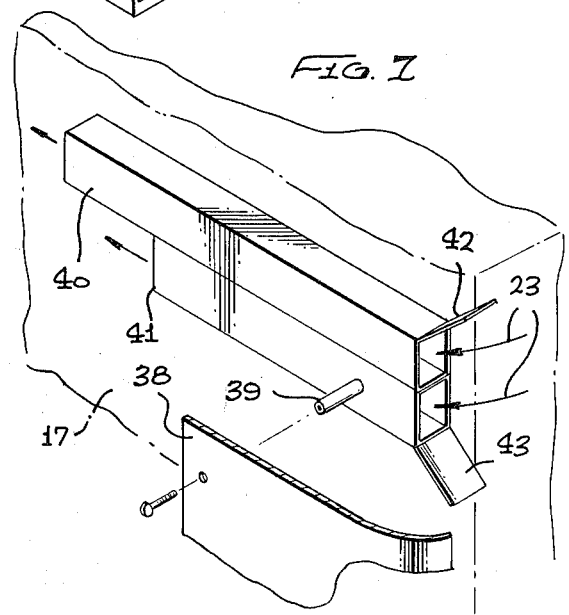

4,316,630

VEHICLE WIND DEFLECTORS

BACKGROUND OF THE INVENTION

1. Field of the Invention

The present invention relates to wind deflection apparatus and more particularly to a novel wind deflecting apparatus carried on trucks and semi-trailers for the purpose of destroying the creation of vacuum immediately adjacent the rear end of the truck or semi-trailer.

2. Brief Description of the Prior Art

In the transportation industry, it is well known that a substantial amount of drag for a truck, trailer or other vehicle is created by the frontal area of the vehicle while it is traveling on a roadway due to the resistance created when the frontal area strikes the air immediately ahead thereof. It is also well known in the industry that deflectors placed at the front of the vehicle which redirect the oncoming air over the top of the vehicle greatly improves the performance of the vehicle with respect to gas mileage and speed. Although such frontal deflectors have been successful in the past, it is noted that during travel, a substantial vacuum is created at the rear of the vehicle whether it be a truck, semi-trailer or the like and that the creation of the vacuum retards the speed or performance of the vehicle. In fact, it has come to the attention of modern vehicle designers that the creation of the vacuum removes a desirable air pressure which could be useful in promoting improved vehicle performance.

Therefore, a long standing need has existed to provide an apparatus for disturbing or preventing the creation of a vacuum at the rear of the vehicle so that normal air pressure is available to enhance the performance of the vehicle with particular respect to speed and gas mileage.

SUMMARY OF THE INVENTION

Accordingly, the above problems and difficulties are obviated by the present invention, which provides a novel wind deflection apparatus at the rear of the vehicle which takes the form of a pair of wind deflectors in which each deflector is of a curved cross section and is disposed or fixed to the vehicle so as to provide an air passageway between each of the deflectors and the structure of the vehicle so as to catch oncoming ram air and conduct the air across the rear of the vehicle. To promote conduction, a plurality of spreader conduits are disposed across the rear of the vehicle so as to discharge or expel ram air across given areas of the vehicle. Guide flanges are carried at the entrance to the spreaders for directing a portion of the oncoming ram air in the passageway between the deflectors and the vehicle into the spreader conduits for discharge therefrom in the desired area.

By such means, the vacuum generally created or produced at the rear of the vehicle is destroyed and the normal air pressure in terms of pressure per square inch is applied to the rear of the vehicle.

Therefore, it is among the primary objects of the present invention to provide a novel wind deflection apparatus for redirecting oncoming ram air around a traveling vehicle so that the creation of a vacuum at the rear end thereof is destroyed or greatly reduced.

Another object of the present invention is to provide a novel means for employing ram air around a traveling vehicle so as to destroy or greatly reduce the vacuum created at the rear thereof whereby normal air pressure is applied to the rear of the vehicle assisting in vehicle performance.

Still another object of the present invention is to provide a novel means and apparatus for redirecting the flow of oncoming ram air around a traveling vehicle which includes wind deflectors at the rear of the vehicle and means for spreading the deflected air across the rear of the vehicle to enhance vehicle performance.

Still a further object of the present invention is to provide a novel wind deflection apparatus including a front wind deflector and a rear wind deflector means which are carried on a traveling vehicle so as to redirect the ram air whereby drag of the vehicle is reduced and creation of a vacuum at the rear of the vehicle eliminated so that vehicle performance in terms of speed and gas savings is produced.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of a typical tractor and semi-trailer vehicle illustrated at rest;

FIG. 2 is a view similar to the view of FIG. 1 illustrating the vehicle in movement and showing ram airflow therearound;

FIG. 3 is a view similar to the view of FIGS. 1 and 2 illustrating the airflow around a vehicle while moving when the vehicle is provided with the wind deflectors of the present invention;

FIG. 4 is an enlarged side elevational view of a wind deflector for the tractor or cab of the vehicle;

FIG. 5 is a perspective view of the novel wind deflectors of the present invention carried at the rear of the vehicle;

FIG. 6 is a top plan view of the rear of the vehicle illustrating airflow with respect to the novel wind deflectors employed in the view of FIG. 5; and FIG. 7 is a perspective view, partially exploded, illustrating the installation and arrangement of the wind deflector and wind spreader pipes employed in the invention.

DESCRIPTION OF PREFERRED EMBODIMENT

Referring to FIG. 1, a typical truck or semi-trailer is illustrated in the general direction of arrow 10 which includes a tractor 11 having a cab 12 which is illustrated as pulling a trailer or semi-trailer indicated by numeral 13. When the vehicle 10 is motionless such as at rest, there is 14.7 pounds per square inch of air pressure on all sides of the vehicle. The application of air pressure is indicated by the arrows 14 and 15 which illustrate that the air pressure is against the front of the trailer as indicated by numeral 16 and the rear of the trailer as indicated by numeral 17.

Referring now to FIG. 2, it can be seen that when the vehicle is moving, a vacuum is created as indicated by the circular arrow 18 directly behind the rear 17 of the trailer 13. Oncoming ram air is indicated by numeral 19 which passes over the top of the vehicle and converges toward the ground slightly at the rear thereof. Ram air is also indicated by numeral 20 which is pressuring against the front 16 of the trailer. The presence of the vacuum 18 removes the air pressure at that location and at the same time the 14.7 pounds per square inch plus the wind velocity is pressing against the front of the vehicle at numeral 16. This condition is at a ratio to the speed of the vehicle as it is moving and the size and shape of the vehicle. Obviously, since the pressure at the rear of the vehicle is now deleted, there is no push or air pressure at the rear thereof which may assist in propelling or pushing the vehicle forward.

Referring now in detail to FIG. 3, the vehicle 10 is illustrated incorporating the wind deflectors of the present invention and it is noted that the airflow 19 and 20 is deflected from the surface 16 of the trailer by a front wind deflector indicated in general by numeral 21. However, it is important to note that the vacuum 18 is eliminated from the rear of the vehicle by means of the rear wind deflectors indicated in general by numeral 22 so that the 14.7 pounds per square inch air pressure is again applied to the rear of the vehicle. The creation of the vacuum 18 is eliminated by the ram air, indicated by numeral 23 which is present at the opposite sides of the trailer 13 and which is redirected by the deflectors 22 immediately behind the rear panel 17 of the trailer 13.

Referring now in detail to FIG. 4, it can be seen that the front wind or air deflector includes a panel 30 which is disposed at an angle with respect to the oncoming air. The angular displacement can be made by means of pivoting the panel 30 with respect to a base 31 via a conventional hinge 32. The base 31 is mounted on top of the cab 12 by any suitable means. A brace 33 supports the panel 30 and may be suitably connected through any one of a series of holes 34 provided in a bracket 35 to compensate for angular adjustment with respect to the base 31 and the oncoming air.

Referring now to FIG. 5, it can be seen that the rear wind deflector 22 includes a pair of deflectors in the direction of arrows 36 and 37. Each deflector includes an elongated vertical panel 38 of arcuate cross section and which is arranged in fixed spaced relationship with respect to the rear corner of the vehicle by a plurality of standoffs, such as standoff 39. In this manner, an air passageway is provided directing the ram air along the sides of the vehicle to deflect or redirect around the corner of the vehicle and to disperse immediately behind the rear thereof which is indicated by numeral 17. As a means for directing the deflected ram air to selected locations at the rear 17 of the vehicle, a plurality of sets of spreader tubes are provided along the length of each deflector 36 and 37 which comprise a first spreader tube or pipe 40 and an adjacent spreader tube or pipe 41 which is of shorter length. Each of the spreader tubes which are arranged in a plurality of sets direct the deflected ram air to selected areas on the back of the vehicle 17.

With respect to FIG. 6, it can be seen that the ram air 23 on opposite sides of the trailer 13 are introduced to the curved deflectors 36 and 37 and through the passageway between the deflectors in the corners of the vehicle into the sets of spreader tubes for dispersement along the back 17 of the vehicle. In broken lines the swing of rear doors is illustrated where it can be seen that the deflectors 36 and 37 will not interfere with the sides of the vehicle when such doors are open.

Referring now in detail to FIG. 7, it can be seen that the spreader tubes 40 and 41 further include angled guide flanges 42 and 43 which are located at the entrance of the tubes and are effective to conduct the ram air 23 into the spreader tubes. In effect, the spreader tubes are conduits for the redirected ram air which is ultimately discharged or dispersed along the back of the vehicle.

In view of the foregoing, it can be seen that the ultimate performance of the vehicle is greatly enhanced by providing the front deflector 21 which reduces the impact of ram air on the front of the trailer or vehicle and which eliminates the creation of vacuum 18 by means of the rear deflectors. There is 14.7 pounds square inch air pressure on all sides of a vehicle. When the vehicle is moving, it moves away from the air at the rear causing a vacuum. This removes the air pressure and as the air pressure is still on the front of the vehicle pressing it back, the motor must overcome it plus the wind velocity pressure.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Wind deflector apparatus for a vehicle comprising the combination of:
   a pair of wind deflectors wherein each deflector is of arcuate cross section and vertically arranged with respect to said vehicle so as to be in spaced apart relationship on opposite sides of the vehicle rear immediately adjacent the juncture of the sides with the rear;
   a plurality of stand-offs securing each deflector to said vehicle so as to define a passageway between the opposing surfaces of each of said deflectors and the associated vehicle side and rear; and
   air spreader means carried on the vehicle rear having an entrance for receiving oncoming ram air and for discharging said ram air immediately adjacent the vehicle rear so as to destroy the creation of vacuum when the vehicle is moving forwardly;
   said spreader means includes elongated tubes arranged in sets across the rear of the vehicle for conducting air to specific locations;
   each of said tubes includes an entrance and an exit wherein said entrance is immediately adjacent said wind deflector and said exit exhausts substantially at the mid-section at the rear of said vehicle.

2. The invention as defined in claim 1 wherein:
   each of said tube entrances is provided with diverging guide plates for directing air from said deflectors into said tubes.

3. The invention as defined in claim 2 wherein:
   said wind deflectors are arranged in vertical spaced apart relationships, and
   said tubes are arranged laterally with respect to said wind deflectors.

4. The invention as defined in claim 3 including:
   a forward wind deflector carried on the cab of the vehicle for deflecting oncoming ram air immediately ahead of said vehicle.

5. The invention as defined in claim 4 wherein:
   said forward wind deflector includes a flat plate angularly disposed with respect to the oncoming ram air so as to direct the ram air upward and rearward.

6. The invention as defined in claim 5 wherein:
   said wind deflectors are wrapped around the opposite corners of said vehicle rear in fixed spaced relationship to said tube entrances.

* * * * *